United States Patent [19]
Grabowski

[11] Patent Number: 5,163,170
[45] Date of Patent: Nov. 10, 1992

[54] SPIN AND OR STALL DETECTOR FOR AN ELECTRICALLY PROPELLED TRACTION VEHICLE

[76] Inventor: Frank M. Grabowski, 7824 E. Lake Rd., Erie, Pa. 16511

[21] Appl. No.: 372,808

[22] Filed: Jun. 29, 1989

[51] Int. Cl.$^5$ .............................................. H02P 5/00
[52] U.S. Cl. ...................................... 318/113; 318/52
[58] Field of Search ................... 318/52, 113, 111, 69, 318/75, 104, 501, 519, 520, 47, 50, 56, 57, 63, 625, 369, 370; 303/91, 74, 100

[56] References Cited

U.S. PATENT DOCUMENTS

| | | | |
|---|---|---|---|
| 3,760,246 | 9/1973 | Gurwicz et al. | 318/52 |
| 3,898,937 | 8/1975 | Johnson | 318/52 |
| 4,012,680 | 3/1977 | Dickerson et al. | 318/79 |
| 4,028,597 | 6/1977 | Delaney et al. | 318/52 |
| 4,292,531 | 9/1981 | Williamson | 318/151 |

Primary Examiner—A. Jonathan Wysocki
Attorney, Agent, or Firm—R. T. Payne

[57] ABSTRACT

For a traction vehicle having two wheels driven by separate electric motors, a spin/stall condition is indicated if one of the wheels is rotating faster than a predetermined reference speed while the other wheel is not rotating, and a total stall condition is indicated if neither wheel is rotating and the magnitude of motor current exceeds a predetermined high level. Correction of any spin/stall condition is attempted by temporarily connecting a power resistor across the motor driving the spinning wheel, whereupon current (and hence torque) in the motor driving the stalled wheel will increase. Once a total stall is indicated, it is allowed to continue for a maximum period of time that varies inversely with the motor current magnitude, and if such condition is not earlier corrected motor damage is avoided by deenergizing both motors on the expiration of this period.

29 Claims, 3 Drawing Sheets

_5,163,170_

SPIN AND OR STALL DETECTOR FOR AN ELECTRICALLY PROPELLED TRACTION VEHICLE

BACKGROUND OF THE INVENTION

This invention relates generally to electric propulsion systems for traction vehicles and, more particularly, to a method and apparatus for detecting and correcting for vehicle stall conditions.

An electric propulsion system for a traction vehicle, such as a large haulage truck, typically comprises a prime mover-driven electric generating means for supplying electric power to a pair of high-horsepower electric traction motors respectively connected in driving relationship to a pair of wheels on opposite sides of the vehicle. The prime mover is commonly a diesel engine, and the traction motors are generally adjustable speed, reversible direct current (d-c) electric motors. A vehicle operator controls the vehicle speed and direction of travel, i.e., forward or reverse, by manipulation of a speed control pedal and a forward-reverse selector switch. This speed control pedal is adapted to control the engine speed (rpm) which determines the power output of the generating means, thus varying the magnitude of the voltage applied to the traction motors.

Deceleration of a moving vehicle is accomplished by releasing the speed control pedal and either allowing the vehicle to coast or activating its mechanical or electrical braking system. In the electric braking mode of operation, the motors behave as generators, and the magnitude of the voltage generated across the armature windings of each motor is proportional to the rotational speed and the field excitation current of the motor. Dynamic braking resistor grids are connected across the armatures of the respective motors to dissipate the electric power output of the motors during electric braking. The average magnitude of current in each resistor grid is a measure of the braking effort of the associated motor.

During operation of such a traction vehicle, it is not unusual for the vehicle to become stalled. The term "stall" is used in its ordinary sense, i.e., to come to a standstill or stop. Two types of stalling are commonly encountered. A first type occurs when one driven wheel loses traction and begins to spin or slip while the other driven wheel stops rotating. This type of vehicle stalling may be referred to as a spin and/or stall condition. A second type of stalling occurs when both driven wheels are stalled, i.e., neither wheel is able to rotate. The first type of stalling may occur, for example, when one of the driven wheels encounters muddy terrain while the other remains on firm ground and the vehicle is so heavily loaded that the wheel on firm ground is unable to propel it. The second type of stalling may occur when a loaded vehicle is trying to ascend a slope or hill.

The electrical power system in most of these traction vehicles is arranged such that the d-c electric traction motors are connected in a series circuit to the vehicle-mounted power source, i.e., an electric generator. When one of the wheels loses traction and begins to spin, the counter electromotive force (CEMF) across the motor driving the spinning wheel increases, and consequently current in the motor pair will decrease. With less current, the non-spinning motor developes less torque, and the vehicle is more likely to stall. While increasing the generator output can somewhat compensate for the reduced power to the non-spinning wheel, available power is limited by both the generator capacity and the commutation or breakdown voltage and current limits of the motors. Thus, it is desirable to provide a method and apparatus for transferring power from the spinning to the non-spinning wheel without exceeding the generator and motor electrical limits.

When a traction vehicle encounters a total stall condition, i.e., neither of the driven wheels is able to rotate, the associated traction motors exhibit relatively low impedance resulting in rapidly increasing motor currents. Very large currents can overheat and damage the commutator bars and other parts of the motors. The period of time during which a non-rotating motor can remain energized without damage varies with the amount of electrical energy being supplied. However, it is desirable to keep the motors energized for as long as possible to maximize the chances of recovering from the stalled condition. It is therefore desirable to provide a method and apparatus for detecting a stall condition and for controlling current to the motors in a manner to attempt correction of the stall without risking damage of the motors.

SUMMARY OF THE INVENTION

A general objective of the present invention is to provide an improved method and system in an electrically propelled traction vehicle for detecting a stall condition of the vehicle.

It is another objective to provide a method and apparatus for detecting a stall condition characterized by the slipping or spinning of at least one but less than all of the driven wheels on an electric traction vehicle and for responding to such a condition by transferring power from the spinning wheel to the stalled wheel.

Yet another object of the present invention is to provide a method and apparatus for detecting a total stall condition of a traction vehicle whose wheels are respectively driven by electric traction motors and for enabling the vehicle to recover from such a condition so long as no motor damage is imminent.

In carrying out the invention in one form, the stall detection system is used on a traction vehicle of the type having a pair of electric traction motors connected in series with one another for energization by a source of electric power. These traction motors are respectively coupled in driving relationship to wheels on opposite sides of the vehicle, and they are selectively operative in a propulsion mode or in an electrical braking mode. The system detects a condition in which at least one of the traction motors is attempting to drive a stalled wheel. If one of the wheels were stalled while the other is spinning, the system causes a power resistor to be temporarily connected in electrical parallel circuit relationship with the armature winding of the motor driving the spinning wheel so as to shunt current from that motor, whereupon current in the motor driving the stalled wheel will increase. This should cause the stalled wheel to begin rotating. Preferably the system includes means for momentarily reducing the magnitude of voltage applied to the traction motors when the shunt resistor is initially connected in parallel with the motor driving the spinning wheel so that large power transients are prevented, and then voltage is ramped up to a magnitude at least as high as existed just prior to being momentarily reduced. If within a predetermined interval of time the stalled wheel does not begin to rotate, additional means is then operative to deenergize both of the motors. In the event that both wheels are stalled and the magnitude of current in either one of the motors is greater then a preselected high level, the system will cause operation of the aforesaid additional means to deenergize both motors at the end of a period of time inversely related to the higher magnitude of current in the traction motors. The system also includes means for preventing the above-summarized responses to stall conditions whenever the motors are operating in their electrical braking mode.

BRIEF DESCRIPTION OF THE DRAWINGS

For a better understanding of the present invention, reference may be had to the following detailed description taken in conjunction with the accompanying drawings in which.

DETAILED DESCRIPTION OF THE DRAWINGS

Figure 1:
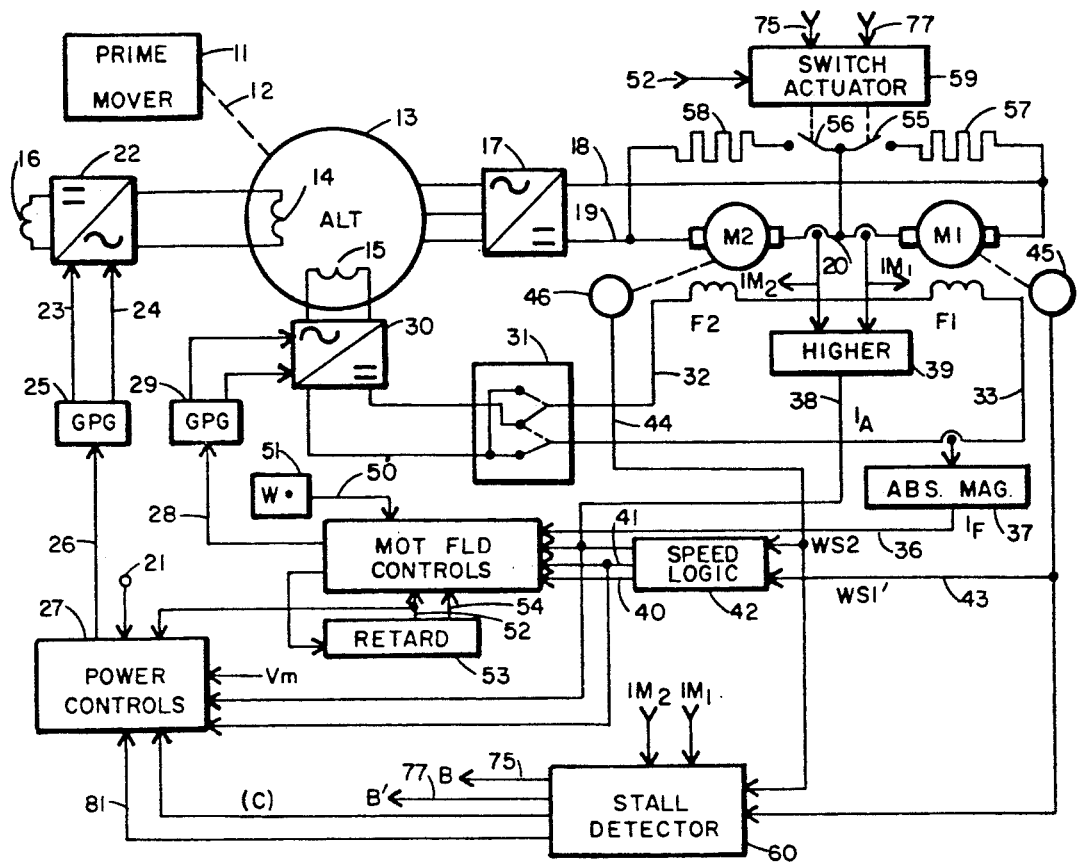
FIG. 1 is a functional block diagram of an exemplary dual motor electric propulsion system for an electric traction vehicle.

The exemplary electric propulsion system that is shown in FIG. 1 is intended to be physically located on a self-propelled traction vehicle such as a large off-highway haulage truck. An operator-controlled throttle, e.g., a foot pedal (not shown), is adapted to control the rotational speed (revolutions per minute) of a prime mover 11 which may, for example, be a diesel engine. The output shaft 12 of the engine is drivingly coupled to the rotor of an alternating current (a-c) generator or alternator 13, which has a set of 3-phase main windings (not shown), a pair of auxiliary (tertiary) windings 14 and 15, and field windings 16. The 3-phase generally sinusoidal alternating voltage that is generated in the main windings of the alternator 13 is converted to direct voltage by means of an uncontrolled full-wave rectifying bridge 17. The prime mover-driven alternator serves as a source of energization for a pair of adjustable speed d-c traction motors M1 and M2 whose respective armature windings are connected, via lines 18, 19 and 20, in series with one another between the output terminals of the rectifying bridge 17. The motors M1 and M2 have separately excited field windings F1 and F2, respectively. The rotors of these motors are respectively coupled through suitable speed-reduction gearing to a pair of wheels (not shown) located on opposite sides of the vehicle. By suitably controlling the speed of the engine 11 and the excitation of the alternator and motor fields, the vehicle can be propelled (also known as "motoring") or dynamically retarded (also known as "electric braking") by its motors in either a forward or reverse direction.

During the montoring mode of operation, the motors M1 and M2 will each rotate at a speed that depends on both the magnitude of excitation current in their fields F1, F2 and the magnitude of the voltage applied to their respective armature windings. The latter magnitude is a function of both the speed at which the alternator 13 is driven and the magnitude of excitation current in the alternator field 16. The alternator field excitation current is supplied by the auxiliary winding 14 of the alternator 13 via a single-phase, full-wave "phase controlled" rectifying bridge 22. Its magnitude depends on the timing of periodic firing signals that are supplied to the rectifier 22 over lines 23 and 24 from a conventional gate pulse generator 25 which is connected to an output line 26 of associated power control means 27.

The power control means 27 receives a first input signal representative of the voltage VM at the output of the rectifying bridge 17, a second input signal representative of the current IA in the armature windings of the motors M1 and M2, a third input signal (from a terminal 21) that varies with the rotational speed of the engine 11, and the other inputs shown in FIG. 1. In the motoring mode, this control means is effective to produce on line 26 an output signal having a value normally representative of any magnitude error between a power feedback signal which is proportional to the product of VM and IA and a load reference signal which varies as a function of engine speed. In the event of relatively high magnitudes of VM, IA, or motor speed, an overriding feedback signal proportional to the appropriate one of these parameters is substituted for the power feedback signal, and during the electric braking mode of operation, a preselected constant reference signal is substituted for the aforesaid load reference signal. The output signal on line 26 controls the operation of the gate pulse generator 25 and thereby determines the magnitude of current in the field 16. As a result, the alternator field excitation is regulated in a desired manner.

As illustrated in FIG. 1, a motor field control means (labeled "MOT FLD CONTROLS") produces an independently variable control signal on an output line 28 which is connected to a conventional gate pulse generator 29. This generator supplies periodic firing signals to another single-phase, full-wave phase controlled rectifying bridge 30 connected between the second auxiliary winding 15 of the alternator 13 and the fields F1 and F2 of the motors M1 and M2. The two motor fields are connected in series with each other to the direct voltage output of the rectifier 30 via lines 32 and 33 and a polarity reversing switch 31. Thus, the auxiliary winding 15, the rectifier 30, and the associated gate pulse generator 29 comprise a separately controllable source of excitation current for the motor fields F1 and F2. This current has a variable average magnitude, and its direction in the motor fields depends on the position of the reversing switch 31. With the switch in its solid-line position, current flows from left to right through the field windings F2 and F1 as viewed in FIG. 1, and the motors rotate in a clockwise direction. On the other hand, with the switch 31 in its broken-line position, current flows from right to left through the field windings and the motors rotate in the opposite or counterclockwise direction.

The average magnitude of excitation current in the series-connected field windings F1 and F2 will depend on the value of the control signal that is supplied to the gate pulse generator 29 over the output line 28 of the motor field control means. The motor field control means receives input signals on seven different lines 36, 38, 40, 41, 50, 52 and 54, respectively. The input on line 36 is a field current signal having a value that varies with the average absolute magnitude (IF) of excitation current in the motor field windings F1 and F2. To derive this signal, the line 36 is coupled to a conventional current transducer in line 33 via suitable means 37 for converting the bipolarity output of the current transducer to a unipolarity voltage signal, on line 36, representative of IF. More particularly, the electric potential on line 36, measured with respect to a predetermined reference potential, e.g., ground, has a magnitude proportional to the number of amperes flowing in line 33, and it has a relatively negative polarity regardless of whether the polarity of the transducer output signal is positive or negative with respect to ground.

The signal on the second input line 38 has a value that varies with the average magnitude of motor armature current. To obtain this signal, the line 38 is coupled via a higher magnitude selector 39 to a pair of current transducers which are respectively located in the connections from the line 20 to the motors M1 and M2. These transducers monitor electric currents in the armature windings of the pair of traction motors M1 and M2 that drive the first and second wheels of the vehicle, and they derive first and second feedback signals IM1 and IM2 representative, respectively, of the average magnitudes of such currents. As a result, the signal IA on line 38 is actually representative of the higher average magnitude of armature current in the two motors.

The signals on the third and fourth input lines 40 and 41 are speed feedback signals representative, respectively, of the actural rotational speeds of the slower motor and of the faster motor. These signals are provided by a speed logic means 42 which in turn is coupled via lines 43 and 44 to a pair of conventional speed sensors 45 and 46 that are respectively associated with the rotors of the two motors M1 and M2. The output of the speed sensor 45 is a signal WS1 whose value varies with the angular velocity of the rotor of motor M1, and the output of the speed sensor 46 is a signal WS2 whose value varies with the angular velocity of the rotor of motor M2. Since each motor rotor is mechanically coupled in driving relationship to a vehicle wheel, these signals are also representative, respectively, of the rotational speeds of the first and second driven wheels. Preferably, each of the signals WS1 and WS2 is actually a train of discrete pulses of constant amplitude and duration but having a variable frequency directly proportional to the speed of the associated wheel, which speed can be expressed either as revolutions per unit of time or as linear speed (e.g., miles per hour) at the perimeter of the tire on the wheel.

The fifth input line 50 originates at a block 51 which represents manually controlled means for providing a speed reference signal W* of preselected value, and the sixth and seventh input lines 52 and 54 originate at a retard command block 53. The latter block represents manually controlled means for producing on line 52 a predetermined command signal when dynamic retarding of the vehicle is desired and for providing on line 54 a braking signal having a value that depends on the degree of dynamic retarding that the operator of the vehicle desires. In response to the command signal being produced on line 52, a pair of electrical switching means or contactors 55 and 56 are actuated in unison from non-conducting or open states to current conducting or closed states so as to connect a first braking resistor grid 57 between lines 18 and 20 and concurrently to connect a second braking resistor grid 58 between lines 19 and 20. Conventional actuating means 59 is used for closing and opening the contactors. Each of the resistor grids 57 and 58 typically has an ohmic resistance in a range of approximately 0.5 to 0.7 ohm. These resistor grids are used to dissipate the electric power output of the respective motors M1 and M2 which behave as generators during the electric braking mode of operation. The amount of braking torque exerted by the motors is a function of both the magnitude of IA and the magnitude of IF. In this mode, IA varies with the voltage generated across the armature windings of the motor, and the magnitude of the generated voltage in turn is proportional to motor speed and field excitation. As previously explained, the magnitude of excitation current in the motor field windings depends on the value of the control signal on the output line 28 of the motor field control means.

In accordance with the present invention, selected ones of the above-described signals and circuit elements are utilized in a system for detecting and initiating corrective action when a stall condition occurs, e.g., when the vehicle speed falls below a predetermined threshold (e.g., 0.2 miles per hour) during the motoring mode of operation. Such a system includes stall responsive means 60, shown as a single block in FIG. 1, to which the first and second wheel speed signals WS1, WS2 and the first and second motor armature current feedback signals IM1 and IM2 are fed.

The stall responsive means 60 is illustrated functionally in FIG. 2 which will now be described. It comprises three separate wheel rotation monitoring and stall sensing means 61, 62, and 63, each of which performs the logical operation indicated in the drawing. More particularly, the first rotation monitoring and stall sensing means 61 is arranged or programmed to perform the logical operation of determining whether or not the wheel speed represented by the first signal WS1 is equal to or nearly zero and the other wheel speed, represented by the second signal WS2, is greater than a predetermined reference speed (e.g., two miles per hour). Since wheel speed signals are generated by a digital encoder in the illustrative system of FIG. 1, wheel speeds are determined by digital counts in which 160 pulses per unit of time is equivalent, for example, to two miles per hour. Hence, if WS2>160, wheel speed exceeds two miles per hour. The monitoring and sensing means 61 is in a logical true state (as indicated, for example, by a high or logical "1" output signal A), only if it senses that the first wheel is not rotating and the second wheel is rotating faster than the reference speed, provided, however, that at the same time-the current magnitude represented by either one of the two motor current feedback signals IM1 and IM2 is greater than a preselected minimum level (e.g., 100 amperes). Similarly, the second rotation monitoring and stall sensing means 62 performs a logical function of determining whether wheel speed represented by the second signal WS2 is equal to or nearly zero, the other wheel speed represented by signal WS1 is greater than the predetermined reference speed, and the magnitude of current in either traction motor is greater than the preselected minimum level. It will be recognized that a high output signal A from the first means 61 indicates that the vehicle wheel to which the motor M1 is coupled is stalled and the other wheel is spinning, whereas a high output signal A' from the second means 62 indicates that the first-mentioned wheel is spinning and the other wheel is stalled.

The third rotation monitoring and stall sensing means 63, on the other hand, will sense a total stall condition which occurs when both driven wheels of the vehicle stop rotating during the motoring mode of operation. The third means 63 is in a logical true state (e.g., its output signal D is high or "1") only if neither of the driven wheels is rotating appreciably, as indicated by both WS1 and WS2 being approximately zero, and the magnitude of current in either motor is greater than another preselected level that is relatively high (e.g., 1,000 amperes). The output signals A, A', and D from the respective stall detectors 61, 62 and 63 are supplied, via an OR logic circuit comprising four diodes 66, 67, 68, and 69, to a lamp 70 or other suitable means for signaling to a vehicle operator that a stall condition exists. Either a total stall or a spin/stall will cause the stall light 70 to be illuminated.

Once a spin/stall condition has been detected, the system automatically attempts corrective action with minimum risk of damage to the motors. For this purpose the system includes means effective in response to a high signal from either one of the means 61 and 62 for reducing voltage on the motor driving the spinning wheel and increasing current in the motor coupled to the stalled wheel. This stall correcting means comprises first timing means 74 that provides an output signal B on a line 75 in programmed response to a high signal A received from the first spin/stall detector 61, and second timing means 76, functionally identical to the first timing means 74, that provides an output signal B' on a line 77 in programmed response to a high signal A' received from the companion spin/stall detector 62. Referring to the timing means 74, the time chart labeled "A" in FIG. 2 depicts the signal A from the first spin/stall detector 61. The signal A will transition from a low (logical 0) to a high (logical 1) level when the detector 61 senses the start of the undesired condition in which the first wheel is stalled while the second wheel is spinning, and it subsequently reverts to 0 at the moment of time "x" when such a condition is alleviated or corrected. The time chart labeled "B" depicts the resulting signal B developed at the output of the timing means 74 which includes suitable means for delaying the 0-to-1 transition of the signal B until the signal A has remained high for a predetermined short time period TD1 after its corresponding transition. This initial time period, which may, for example, be 0.5 second, avoids initiating corrective action in response to a spurious 0-to-1 transition of A not caused by a true spin/stall condition. The timing means 74 also has suitable means for delaying the subsequent 1-to-0 transition of the signal B for a minimum length of time after the moment of time x, which time may be in the order of five seconds. This minimum length of time "TMIN" ensures that the alternator output voltage has returned to its full value prior to releasing the corrective action.

The output signal B of the spin/stall timing means 74 is fed over the line 75 to suitable means for establishing a current path of relatively low resistance in parallel with the traction motor M2 that is coupled to the spinning wheel, whereupon current in the series-connected motor M1 driving the stalled wheel will increase and the resulting increase in torque tends to correct the spin/stall condition. Preferably the contactor 56 and the dynamic braking resistor grid 58 (FIG. 1) form the low resistance current path, and accordingly the output line 75 is connected to the contactor actuating means 59 which is suitably constructed and arranged to respond to a 0-to-1 transition of the signal B on the line 75 by actuating the contactor 56 to its closed position so as to connect the braking resistor 58 across the armature of the motor M2. This effectively reduces the voltage on the motor M2 and concurrently enables the alternator 13 to supply more current to the motor M1. With less voltage, the motor M2 will rotate at a slower speed. With increased current, motor M1 develops additional torque which should correct the stall condition. Subsequently, in response to a 1-to-0 transition of the signal B, the actuating means 59 returns the contactor 56 to its opened position. The actuating means 59 is also arranged to respond to 0-to-1 and 1-to-0 transitions of the output signal B' on the line 77 by respectively closing and opening the companion contactor 55 so as to connect the resistor grid 57 across the traction motor M1 in the event the second spin/stall detector 62 indicates that the wheel driven by this motor is spinning and the other wheel is stalled.

In order to prevent or minimize current surges and other undesirable transients upon closing either one of the contactors 55 or 56, both of the signals B and B' from the respective timing means 74 and 76 are coupled through isolating diodes 79 to additional means 78 for providing a control signal C that overrides the other inputs to the power control means 27 (FIG. 1) and causes it to reduce alternator excitation so that the magnitude of voltage applied to the traction motors M1 and M2 is momentarily reduced whenever one of the contactors is commanded to close by a 0-to-1 transition of the signal B or B'. The time chart labeled "B/B" in the additional means 78 shown in FIG. 2 depicts the output signal B on line 75 or the output signal B' on line 77 from either one of the companion timing means 74 and 76. The additional means 78 is arranged or programmed so that at the instant one of these signals transitions from a logical 0 to a logical 1 level, the signal C is applied as a power reference to the power control means 27 to effect an immediate reduction of motor voltage. The signal out of the means 78 is depicted by the chart labeled "C." Preferably, it is abruptly driven or clamped to a predetermined negative value whenever there is a 0-to-1 transition of the signal B or B', and then it automatically increases at a rapid but controlled rate back to its quiescent value (e.g., zero). The ramp time can be on the order of 0.5 second, for example. As a result, there is a controlled re-application of voltage to the traction motors following the momentary reduction thereof, and the voltage soon increases to a magnitude at least as high as existed just prior to being momentarily reduced.

As is described above, the output signal D of the third stall detector 63 is high during a total stall condition, i.e., a condition in which neither of the driven wheels of the vehicle is rotating. When this condition is indicated, the high signal activates lock-out timing means 80 to which it is coupled. It will be noted that the output signals A and A' from spin/stall detectors 61 and 62 are also coupled, via the diodes 66 and 67, to the lock-out timer 80. The output signal of the lock-out timer 80 is fed over a line 81 to the power control means 27 (FIG. 1) which is arranged or programmed to respond to a 0-to-1 transition of this signal by rapidly reducing the output power of the main alternator windings to zero, thereby completely deenergizing both of the motors M1 and M2. After such response, a manual reset is required before power can be re-applied to the motors. A lamp 82 connected to the line 81 is illuminated whenever the signal on this line is high.

The lock-out timer 80 has two different timing functions. The first timing function is initiated by a 0-to-1 transition of the spin/stall signal A (or A'). This particular function introduces a fixed time delay TLO2 of, for example, ten seconds. Upon the expiration of this predetermined interval of time, measured from the moment a spin/stall condition occurs, the signal on line 81 changes from 0 to 1 to cause a total lock-out of the system, unless the spin/stall was earlier corrected and consequently the signal A (or A') did not remain high for the duration of this timing interval. The actual time TL02 will depend upon the particular motors and power control system for the traction vehicle.

The second timing function of the lock-out timer 80 is initiated by a 0-to-1 transition of the signal D when a total stall condition occurs. This function introduces a time delay of variable length TL01, at the end of which the output signal on line 81 will change from 0 to 1 to cause deenergization of the traction motors and lock-out of the system (unless the total stall is earlier corrected, in which event the timer is quickly reset when D goes low). TL01 is an inverse function of the higher magnitude of current in the motors M1 and M2, as represented by whichever one of the two current feedback signals IM1 and IM2 is greater. In other words, the length of this delay decreases as the higher current magnitude increases. As is shown in FIG. 2, the motor current feedback signals are fed to the lock-out timer 80 through a higher magnitude selector 83.

Figure 2:
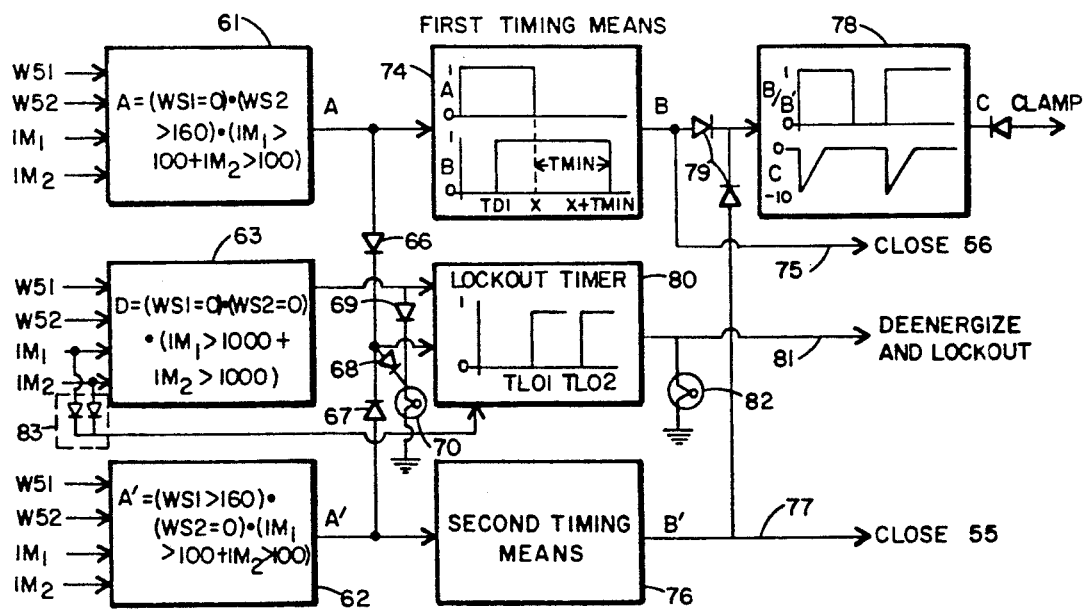
FIG. 2 is an expanded block diagram of one form of a novel stall detector shown as a single block in FIG. 1.

While the spin/stall and total stall detectors 61, 62, and 63 are shown in FIG. 2 as detecting zero wheel speed (WS1=0 and/or WS2=0), in practice they would actually be set to respond if the speed were under a threshold approaching zero. For example, any speed less than 0.2 miles per hour may represent a stall.

Figure 3:
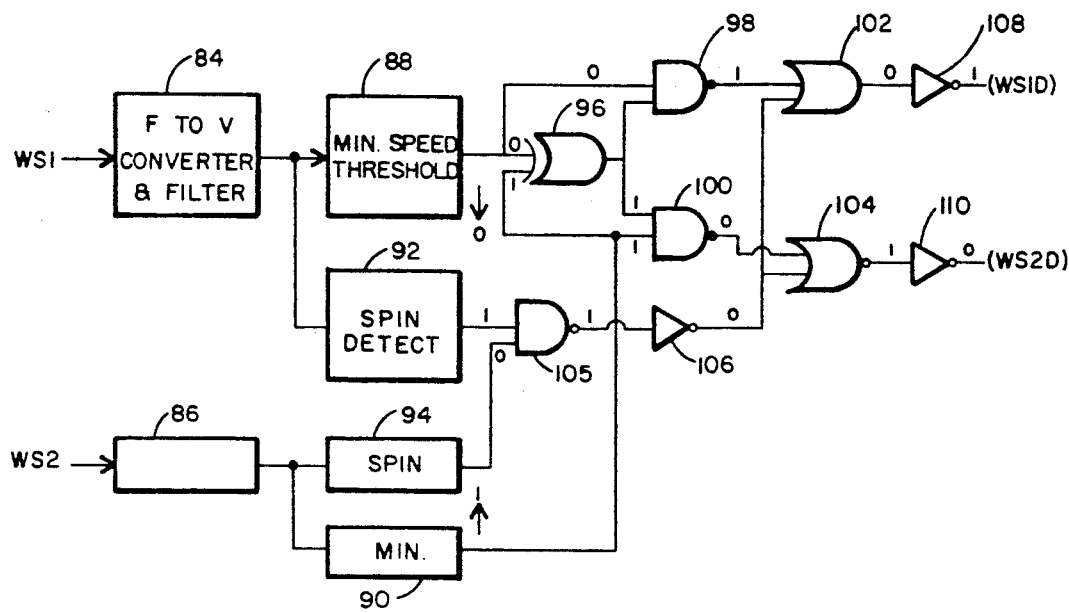
FIGS. 3, 4, 5, 6, and 7 are partially schematic and partially block diagrams showing practical embodiments of the respective parts of the FIG. 2 stall detector.

The presently preferred embodiments of the inventive features illustrated in FIG. 2 are shown in FIGS. 3-7. Referring first to FIG. 3, the wheel speed signals WS1 and WS2 are applied to respective frequency-to-voltage converters 84 and 86 of a type well known in the art. As was previously mentioned, the signals WS1 and WS2 are generally pulse signals obtained from the speed sensors 45 and 46. Each of the frequency-to-voltage converters 84 and 86 provides an analog voltage proportional to the frequency of the pulses from the associated speed sensor. These analog voltages are applied, respectively, to minimum speed threshold detection circuits 88 and 90 and also to spin detection circuits 92 and 94. The minimum speed threshold circuits 88 and 90 may comprise comparators for comparing the analog values of the signals from converter circuits 84 and 86 to a preselected threshold value. As mentioned above, a threshold value corresponding to a vehicle speed of 0.2 miles per hour may be selected. Thus, if either one of the wheel speeds is less than 0.2 miles per hour, the corresponding threshold circuit 88 or 90 will provide a logical signal indicating that the associated wheel speed signal is less than the threshold. The minimum speed threshold detection circuits 88 and 90 are arranged or programmed to generate logical 0 signals whenever the values of their respective input signals are less than the threshold.

The signals from the speed threshold detection circuits 88, 90 are logically combined in an exclusive NOR circuit 96. When both of these signals are 0 (both vehicle wheels are stalled) or both are 1 (neither wheel is stalled), the output of the exclusive NOR circuit is low or 0; otherwise it is high or 1. The signals from the detection circuits 88, 90 are also coupled to respective first input terminals of a pair of NAND logic circuits 98 and 100. As is shown in FIG. 3, a second input terminal of each of the NAND circuits 98 and 100 is coupled to the output of the exclusive NOR circuit 96. Whenever a condition exists in which only one of the two signals WS1 and WS2 has a value below the minimum speed threshold, the output of the corresponding one of the NAND logic circuits 98 and 100 is in its high or logical 1 state while the output of the other is a logical 0. On the other hand, if both WS1 and WS2 were above the threshold or both were below the threshold, then both of the NAND circuits 98 and 100 would have 1 output signals.

The signals developed by the NAND circuits 98 and 100 are coupled to respective first input terminals of a pair of NOR logic gates 102 and 104. These particular logic gates in conjunction with the spin detection circuits 92 and 94 prevent the system from indicating a spin/stall condition when in fact the speed threshold circuits 88 and 90 have been triggered by the traction vehicle making a sharp turn. It will be appreciated that in a sharp turn, the speed of one of the wheels may approach or equal zero while the speed of the other wheel is appreciably higher. In the spin detection circuits 92 and 94 the analog values of the wheel speed signals from the converter circuits 84 and 86 are compared with a second threshold value. This second threshold value is selected to be sufficiently high to assure that a true spin/stall condition is detected rather than a vehicle turn. The second threshold is set at a value corresponding to a predetermined "reference" speed of, for example, two miles per hour. If neither one of the wheel speed signals WS1 and WS2 has a greater value than the second threshold, no spin/stall condition can be detected.

The outputs of the spin detection circuits 92 and 94 are logical signals, with these circuits being arranged or programmed so that a logical 1 output signal is provided so long as the associated wheel is not rotating faster than the predetermined reference speed. As is indicated in FIG. 3, these output signals are combined in a NAND logic circuit 105. The signal developed by the circuit 105 is inverted by an inverter 106 and thereafter coupled to the respective second input terminals of the two NOR gates 102 and 104. Note that if either wheel speed were greater than the predetermined reference speed, at least one of the two spin detection circuits 92, 94 would provide a logical 0 output which ensures a logical 1 output at the NAND circuit 105, whereby the output of inverter 106 is now a logical 0 and the output of each NOR gate 102, 104 will be determined by the output signal from the respectively associated NAND circuits 98, 100. In the case of a spin/stall condition, the output signal from one of the NAND circuits 98 and 100 will be at a logical 0 level which causes the corresponding one of the NOR gates 102, 104 to have a 1 output, whereas the other NOR gate will have a 0 output.

The output signals from the NOR gates 102, 104 are respectively coupled to two inverters 108 and 110. Accordingly, the output of each of the inverters 108, 110 is the opposite of the output from the corresponding one of the gates 102 and 104. Whenever a spin/stall condition exists, whichever one of the inverters 108, 110 is associated with the spinning wheel has a logical 0 output and the other has a logical 1 output. The output signal of the first inverter 108 is labeled "WS1D," and the output signal of the second inverter 110 is labeled "WS2D."

Figure 4:
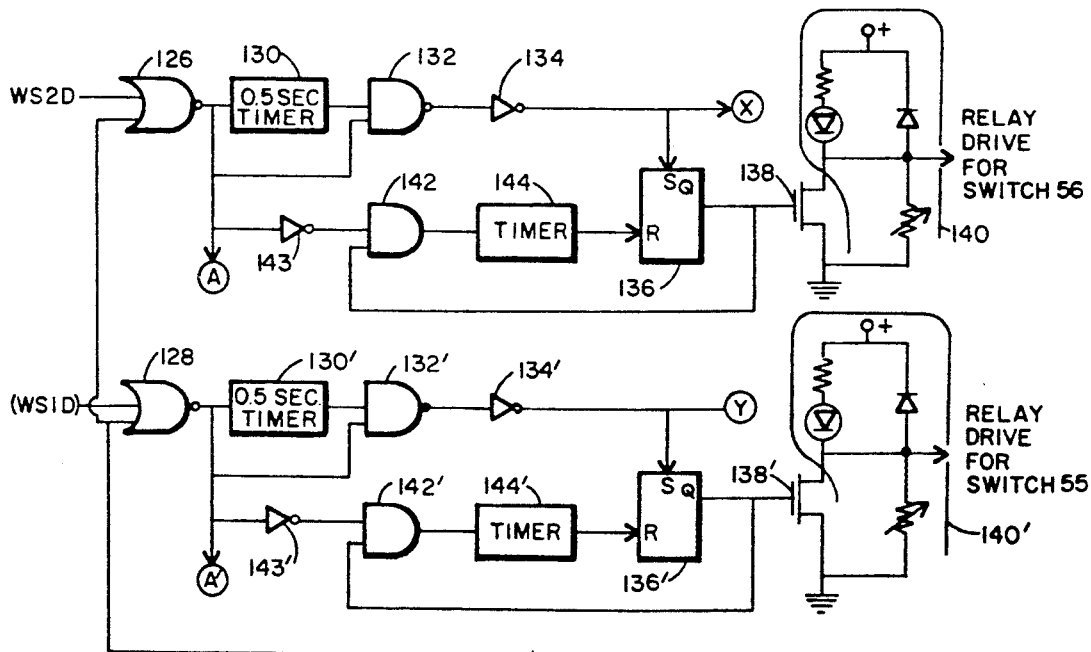
Figure 4:
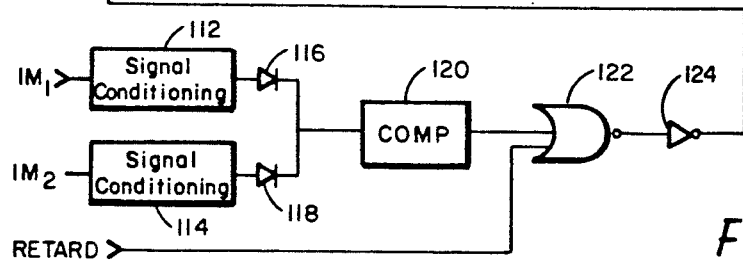

Usually no spin/stall indication is desired so long as the magnitude of current in each of the traction motors is less than a preselected minimum level, e.g., 100 amperes. Note that the above-described wheel speed differential (e.g., WS1<0.2 and WS2>2.0) could occur when the vehicle is coasting or the operator is applying its mechanical brakes, in which event the motor current magnitude would be relatively low. FIG. 4 illustrates this additional function. The current feedback signals IM1 and IM2 are applied to two signal conditioning circuits 112 and 114, respectively. The signals IM1 and IM2 are representative of the current magnitudes in the armature windings of the respective motors M1 and M2 (FIG. 1). The signal conditioning circuits adjust the amplitude of the signals IM1 and IM2 to appropriate levels for use in an analog threshold comparison circuit. The signal conditioning circuits 112 and 114 also provide some filtering to remove transients and to otherwise smooth the current representative signals. After conditioning, the IM1 and IM2 signals are fed through a higher magnitude selector comprising a pair of diodes 116 and 118 to a comparator 120 where the signal of higher magnitude is compared with a certain value corresponding to the preselected minimum level of motor current.

The spin/stall detection and correction system should be inhibited whenever the traction motors are operating in an electrical braking mode, since the braking or retard resistor grids 57, 58 are then connected across the traction motors M1 and M2 by the contactors 55 and 56, respectively. Accordingly, a signal labeled "RETARD" in FIG. 4 is combined with the output signal from the comparator 120 in a NOR gate 122 for the purpose of preventing the system from indicating a stall condition when the motors are operating in the braking mode. The RETARD signal is derived from the retard command block 53 (FIG. 1). So long as the braking mode is in effect, this signal is high or 1, thereby forcing the output of the NOR gate 122 to a logical 0.

If the traction motors are not operating in a retard mode, the RETARD signal will be a logical 0 and now the state of the output signal from comparator 120 will determine the output state of the gate 122. So long as the average current magnitude in each of the motors is less than the preselected minimum level, the output state of the comparator 120 will be high or 1; otherwise it is low or 0. If the comparator output is 0, the output developed by the NOR gate 122 will be a logical 1 signal. This signal is inverted by an inverter 124 the output of which is coupled in turn to corresponding input terminals of a pair of NOR gates 126 and 128. A second input terminal of each of the latter gates is connected to receive the output signal from a different one of the inverters 108, 110 illustrated in FIG. 3. The output signal WS1D of the first inverter 108 is supplied to the second gate 128, and the output signal WS2D of the second inverter 110 is supplied to the first gate 126.

Assuming that the higher magnitude of motor current is above the preselected minimum level and the traction motors are not in their electrical braking mode, the output signal from the inverter 124 will be a logical 0 level. Accordingly, the output states of the NOR gates 126 and 128 will now be determined by the signals WS2D and WS1D, respectively. WS2D=0 and WS1D=1 if the wheel being driven by motor M2 is spinning while the other wheel is stalled, whereas WS1D=0 and WS2D=1 if the wheel being driven by motor M1 is spinning and the other wheel is stalled.

The outputs of the NOR gates 126 and 128 are respectively coupled to a pair of duplicate 0.5 second timers 130 and 130' for providing the initial time delay TD1 described with reference to FIG. 2. Since identical circuits are connected to the two gates 126 and 128, only those connected to the first gate 126 will be described. The corresponding circuits connected to the gate 128 are indicated by primed reference numbers otherwise the same as the reference numbers of the circuits connected to the gate 126. The first NOR gate 126 is effective in response to a 1-to-0 transition of the signal WSD2 at its input to change the state of its output signal A from 0 to 1. Timer 130 is activated by a 1 signal from the gate 126, and after remaining active for a one-half second interval this timer will produce a logical 1 output signal. The signal A from gate 126 and the output signal of timer 130 are both fed to input terminals of a NAND logic circuit 132. In response to concurrent 1 signals at its input terminals, the circuit 132 produces a logical 0 output signal which is then inverted by an inverter 134 and applied to a set input S of a flip-flop 136. The flip-flop 136 responds to the 0-to-1 transition at S by effecting a 0-to-1 transition at its Q output. The resulting 1 signal at the Q output is applied as a gating signal to turn on a transistor switch 138. The transistor 138 is connected into a driver circuit 140 which is coupled to a relay (not shown) which controls actuation of switch 56 shown in FIG. 1. This causes the switch 56 to close and connect the braking or retard resistor 58 in parallel with the motor M2.

The Q output of flip-flop 136 is also connected to a first input terminal of an AND logic circuit 142. The output of the first NOR gate 126 is supplied, via an inverter 143, to the second input terminal of the circuit 142, and the output terminal of the latter gate is connected to a reset input R of the flip-flop 136. Preferably, as is shown in FIG. 4, a second timer 144 is included in the connection between the circuit 142 and the input R of the flip-flop. The timer 144 provides the previously described delay TMIN after the spin/stall condition is corrected and before resetting the flip-flop 136 which will turn off the transistor switch 138 which then causes the actuating means 59 to return the switch 56 to its open position, thereby disconnecting the resistor 58 from across the motor M2.

Note that the timer 144 is not activated to start timing until the spin/stall condition is corrected, at which time the AND circuit 142 will receive logical 1 signals from both the Q output of flip-flop 136 and the inverted output A of the NOR gate 126 and the output state of the circuit 142 changes from 0 to 1. If the 1 output state of the circuit 142 continues without interruption for the length of time TMIN, which for purposes of example has been set at five seconds, the timer 144 then times out and sends a high or 1 signal to the reset input R of flip-flop 136. The flip-flop 136 responds to the 0-to-1 transition at R by effecting a 1-to-0 transition at its Q output. The resulting 0 signal at the Q output turns off the transistor 138 and concurrently causes the output state of the circuit 142 to change to 0 which resets the timer 144. It will be apparent in FIG. 4 that the signal ("X") applied to the set input S of the flip-flop 136 changed from 1 to 0 simultaneously with the 1-to-0 transition of the output signal A of the NOR gate 126 upon correction of the spin/stall condition. Thus Q output of the flip-flop will remain 0 until the next 0-to-1 transition of X in delayed response to the same transition of A.

Figure 5:
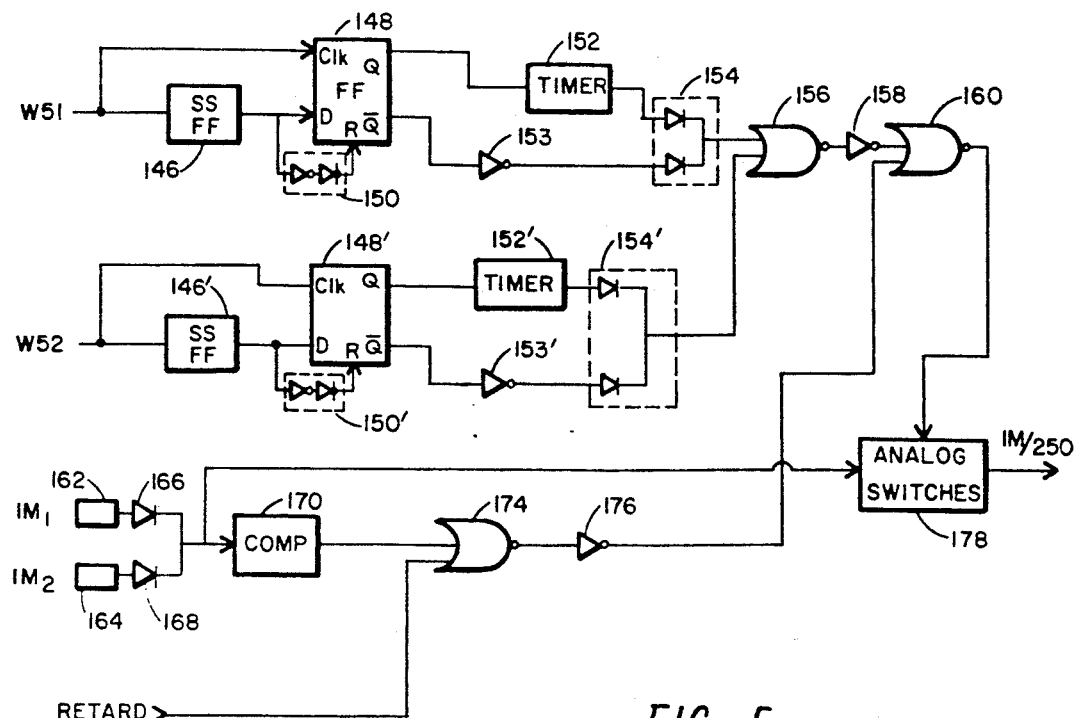

FIG. 5 shows the presently preferred embodiment of means for indicating a total stall condition. The digital wheel speed signals WS1 and WS2 are appropriately conditioned and then applied to retriggerable single shot multi-vibrators 146 and 146', respectively. These signals are also respectively applied to clock inputs of D-type flip-flops 148 and 148'. Following the signal path for the first signal WS1, the multi-vibrator 146 is arranged or programmed to provide output pulses of predetermined duration, for example, 100 milliseconds, which pulses are coupled to the D input of the flip-flop 148. These pulses are also delayed by two serially connected inverters 150 and then applied to the reset input R of the flip-flop.

The wheel speed signals WS1 and WS2 are typically variable frequency trains of 60-microsecond pulses. If the period of WS1, i.e., the time between the application of two consecutive pulses to the multi-vibrator 146, were less than the pulse width of the output pulses developed by the multi-vibrator, the multi-vibrator would be retriggered during each cycle resulting in a constant logical 1 output at the D input of the flip-flop 148. The first positive going signal that the flip-flop 148 receives at its clock input will set its Q output at a logical 1 and its Q-bar output at a logical 0. The Q output is connected, via a timer 152 and an OR gate 154, to the first input terminal of a logical NOR gate 156, and the Q-bar output is connected, via an inverter 153 and the same OR gate 154, to the same input terminal of the gate 156. As can be seen in FIG. 5, the other input terminal of the latter gate is coupled to the duplicate circuit 146'-154' that processes the second wheel speed signal WS2. So long as there is a 1 signal at the output of any one of the circuit components 152, 153, 152', or 153', the output state of the NOR gate 156 will be low or 0.

When the frequency of the signal WS1 drops below a certain minimum threshold, e.g., 10 Hertz, corresponding to a preselected low wheel speed (e.g., approximately 0.25 mph), the flip-flop 148 will be reset, whereupon its Q output changes to a logical 0 and its Q-bar output changes to a logical 1. Consequently the output of the inverter 153 now changes from 1 to 0, but the timer 152 introduces a relatively short time delay, for example, 1.5 seconds, before its output changes from 1 to 0. As soon as the signals from both of the OR gates 154 and 154' are 0, the output state of the NOR gate 156 changes from 0 to 1. (If desired, the circuit components 146-56 and 146'-54' could be replaced by a functionally equivalent arrangement wherein the outputs of the two minimum speed threshold detection circuits 88 and 90 [FIG. 3] are respectively connected to two inputs of a NAND logic circuit [not shown].)

The output of the NOR gate 156 is connected via an inverter 158 to a first input terminal of another NOR gate 160. The other input of the latter gate is supplied with a low or 0 signal only when the magnitude of motor current equals or exceeds a preselected high level, whereby a 1 signal at the output of the gate 160 indicates that a total stall condition has occurred. To determine whether or not motor current is above this level, the current feedback signals IM1 and IM2 are respectively conditioned in signal conditioning circuits 162 and 164 and then fed through a higher value selector, comprising a pair of diodes 166 and 168, to a comparator 170 where the signal of higher magnitude is compared with a certain value corresponding to the preselected high level (e.g., 1,000 amperes or more) of motor current. The RETARD signal is combined with the output signal from the comparator 170 in a NOR gate 174 for the purpose of preventing the system from indicating a total stall condition when the traction motors are operating in the braking mode. So long as the braking mode is in effect, the RETARD signal is high or 1, thereby forcing the output of the NOR gate 174 to a logical 0.

If the traction motors are not operating in a retard mode, the RETARD signal will be a logical 0, and now the state of the output signal from comparator 170 will determine the output state of the gate 174. So long as the average current magnitude in each of the motors M1 and M2 is less than the preselected high level, the output state of the comparator 170 will be high or 1; otherwise it is low or 0. If the comparator output is 0, the output developed by the NOR gate 174 will be a logical 1 signal. This signal is inverted by an inverter 176 the output of which is coupled in turn to the second input terminal of the NOR gate 160. If the speed of each of the driven wheels is approximately zero and the higher motor current is above the preselected level, the NOR gate 160 will provide a logical 1 signal to an analog switch 178. This signal is utilized to activate the analog switch 178 to allow it to pass the larger of the scaled current feedback signals IM1 and IM2 from the diodes 166 and 168. The passed signal has been designated as IM/250 in FIG. 5 to indicate that it is a scaled representation of motor current during a total stall condition.

Figure 6:
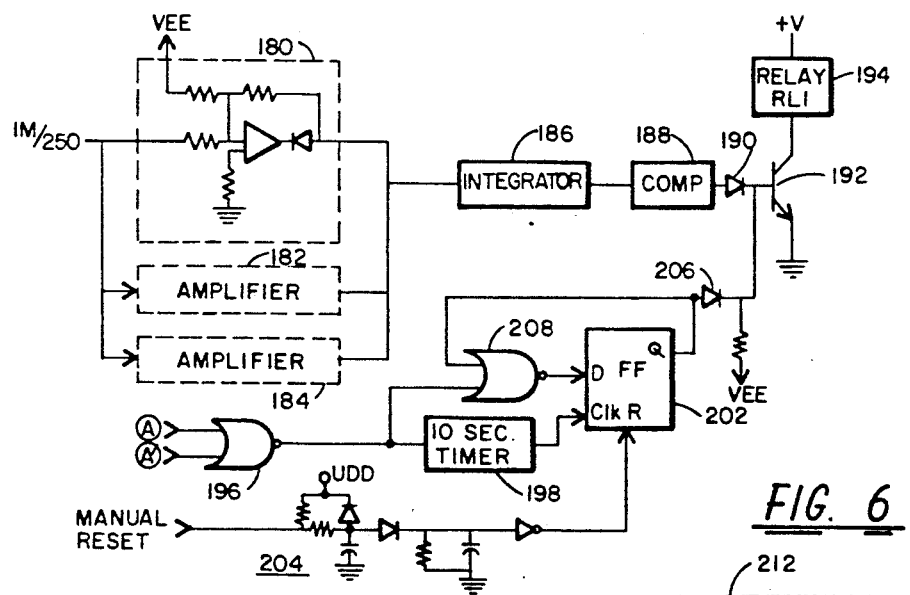

As previously mentioned, the system will respond to the indication of a total stall by deenergizing the traction motors after a period of time that varies inversely with the magnitude of motor current. The lower the current, the longer the motors can safely remain energized, without risking overheating and damage, as they continue to apply torque to the driven wheels in an attempt to move the vehicle and thereby recover from the stall condition. In order to establish this inverse time-current function, the motor current signal IM/250 is coupled to a plurality of parallel connected amplifier circuits 180, 182 and 184 which are shown in FIG. 6 and will now be described. These amplifier circuits in combination comprise a function generator. Each of the amplifiers is biased to a particular break point so that the sum of the output signals generated by the amplifiers comprises three different straight line segments which approximate an inverse negative exponential signal proportional to the value of the signal IM/250. A schematic representation of amplifier circuit 180 is illustrated and will be recognized as a common amplifier circuit of a type well known in the art having a break point which can be chosen by appropriate selection of the feedback and biasing resistors coupled to the amplifier. Such amplifiers connected as function generators are well known in the art, and a detailed description of the techniques of such design are disclosed in the book Analog Computations by Albert S. Jackson (McGraw Hill Book Company, Inc. New York, N. Y., 1960).

The amplifiers 180, 182 and 184 work in conjunction with an integrator 186 to provide an exponential function for establishing the desired inverse time-current characteristic for allowing the traction vehicle to overcome a stall condition. In one practical example, a traction vehicle can be allowed as much as twenty seconds to overcome a stall with a current of 1,000 amps, whereas at a current of 2,500 amps the maximum time to recover is limited to less than one second. It will be noted that the outputs of the amplifiers 180, 182 and 184 are logically OR'ed so that the most positive output value is supplied to the integrator 186. The integrator output value, which is a positive going exponential ramp, is compared to a preselected threshold level in a comparator 188, and when it rises above this level a high or 1 output signal is generated by the comparator 188. The latter signal is fed through an isolating diode 190 to a gate terminal of a transistor switch 192. The switch 192 is coupled into a relay circuit 194 which is operatively associated with the power controls 27 of FIG. 1 and effective, when the transistor 192 is turned on by the 0-to-1 transition of the comparator output signal, to remove power from the motors M1 and M2 by reducing the alternator output voltage to zero and interrupting excitation current in the alternator and motor fields.

FIG. 6 also illustrates the presently preferred embodiment of the lock-out timing function utilized in conjunction with the spin/stall correction function as described in FIG. 2. The terminals labeled "A" and "A'" at the inputs of a NOR gate 196 in FIG. 6 are respectively supplied with the signals A and A' from the outputs of the NOR gates 126 and 128 in FIG. 4. Normally both of these signals will be at logic 0 levels and the output state of the NOR gate 196 is high. But when a spin/stall condition occurs, only one of the signals A and A' changes to a logic 1 level, in which event the output state of the gate 196 changes to 0. A 0 output at the gate 196 activates a timer 198 which, upon the expiration of the fixed time TLO2 (e.g., ten seconds) measured from the 1-to-0 transition of the gate output, changes its output signal from 0 to 1. The latter signal is coupled to a clock input of a D-type flip-flop 202. The output of the gate 196 is also coupled to a first input terminal of a NOR gate 200, and the output terminal of the gate 200 is connected to a D input of the flip-flop 202. The Q output of flip-flop 202 is connected to a second input terminal of the gate 200 and through an isolating diode 206 to the gate terminal of transistor 192. A reset terminal R of the flip-flop 202 is connected to a manual reset circuit 204.

If a spin/stall condition exists for more than the delay time established by the timer 198, a clock signal from timer 198 will be applied to flip-flop 202 causing its Q output state to transition to a logical 1 state. This signal will turn on the transistor 192 and thereby force shutdown of power to the traction motors M1 and M2. At the same time, the logical 1 state of the Q output is coupled through NOR gate 200 to the D input of flip-flop 202 to latch it in its present state until receipt of a reset signal. In the preferred embodiment, reset is allowed only by a manual means, such as an operator actuated reset switch. In FIG. 6, a manual reset command is coupled through an appropriate driver and filter circuit 204 before application to the reset terminal R of flip-flop 202.

Figure 7:
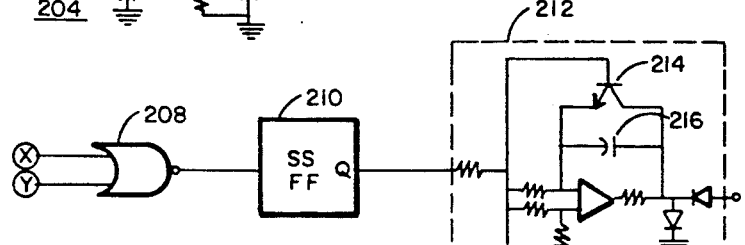

One additional function described with reference to FIG. 2 is the power clamp which momentarily reduces the magnitude of voltage applied to the motors M1 and M2 in response to an indication of a spin/stall condition. FIG. 7 illustrates one method of implementing this function. In FIG. 7, the "X" and "Y" input terminals of a NOR gate 208 are respectively supplied with the corresponding X and Y signals from the outputs of the inverters 134, 134' in FIG. 4. An output terminal of the gate 208 is connected to an input terminal of a single shot multi-vibrator 210. When the multi-vibrator 210 is triggered by a 0-to-1 transition of either one of the X and Y signals in delayed response to detection of a spin/stall condition, it provides a high or 1 output pulse which is coupled to an integrator circuit 212. In particular, this output pulse turns on a transistor switch 214 connected in parallel with an integrating capacitor 216 in the integrator circuit. This causes the capacitor 216 to rapidly discharge, thereby forcing the output of the integrator circuit to a predetermined relatively negative value.

As soon as the multi-vibrator 210 times out, the turn-on signal is removed from the transistor 214, thereby allowing the capacitor 216 to recharge which creates a ramp function as it brings the output signal level of the integrator 212 back to a quiescent value. The output signal generated by the integrator 212 is supplied to the power control circuit 27 of FIG. 1 as a power reference so that the voltage applied to the motors M1 and M2 is momentarily reduced at the same time one of the transistor switches 138 and 138' (FIG. 4) is turned on to initiate closing of the corresponding contactor 56 or 55.

While the principles of the invention have now been disclosed in an illustrative embodiment, it will become apparent to those skilled in the art that many modifications of the structures, arrangements and components presented in the above illustrations may be made in the practice of the invention in order to develop alternative embodiments suitable to specific operating requirements without departing from the scope and principles of the invention as set forth in the claims which follow.

I claim:

1. A stall detection system for a traction vehicle having at least one pair of electric traction motors operatively connected to at least two vehicle wheels and having means for deriving first and second signals representative, respectively, of the rotational speeds of such wheels, the system comprising:
   first means, responsive to the first and second signals, for indicating when the speed of one of the wheels is approximately zero and the speed of the other wheels is greater than a predetermined reference speed;
   second means, responsive to the first and second signals, for indicating when the speed of both of the wheels is approximately zero; and
   means for inactivating the first indicating means and for inactivating the second indicating means whenever the motors are operating in an electrical braking mode.

2. The system of claim 1 further comprising:
   means for deriving third and fourth signals representative, respectively, of the magnitudes of electric currents in the pair of traction motors that drive the vehicle wheels, wherein the first indicating means is inactivated so long as the magnitude of current in each of the motors is less than a preselected minimum level.

3. The system of claim 2 wherein the second indicating means, also responsive to the third and fourth signals, is inactivated so long as the magnitude of current in each of the motors is less than another preselected level which is higher than the preselected minimum level.

4. The system of claim 1 further comprising:
   means for deriving third and fourth signals representative, respectively, of the magnitudes of electric currents in the pair of traction motors that drive the vehicle wheels, wherein the second indicating means is responsive to the third and fourth signals and will not indicate that the speed of both wheels is approximately zero when the magnitude of current in each of the motors is less than a preselected level.

5. A stall detection and correction system for a traction vehicle having at least one pair of electric traction motors, operatively connected for energization, operatively connected to vehicle wheels and including means for deriving first and second signals representative, respectively, of the rotational speeds of such wheels, the system comprising:
   means, responsive to the first and second signals, for indicating a first condition when the speed of one vehicle wheel is approximately zero and the speed of the other wheel is greater than a predetermined reference speed;
   means, responsive to an indication of the first condition from the indicating means, for establishing a current path in parallel with the motor operatively connected to the other vehicle wheel, wherein current in the motor operatively connected to the one wheel will increase and the resulting increase in torque at the one wheel tends to correct the first condition;
   means for deriving third and fourth signals representative, respectively, of the magnitudes of electric currents in the pair of traction motors that drive the vehicle wheels;
   means, responsive to the first and second signals, for indicating a total stall condition when the speed of each of the wheels is approximately zero; and
   means responsive to the third and fourth signals and to an indication of a total stall condition from the total stall indicating means, for deenergizing the motors in response to the occurrence of a total stall condition.

6. The stall detection and correction system of claim 5 further comprising:
   means for deenergizing the traction motors if the speed of the one wheel remains approximately zero for at least a predetermined interval of time while the current path establishing means is activated.

7. The stall detection and correction system of claim 5 further comprising:
   means for preventing the first means from indicating a spin/stall condition whenever the motors are operating in an electrical braking mode.

8. The stall detection and correction system of claim 5 further comprising:
   means for deriving third and fourth signals representative, respectively, of the magnitudes of electric currents in the pair of traction motors that drive the vehicle wheels, wherein the indicating means, also responsive to the third and fourth signals, will not indicate a spin/stall condition so long as the magnitude of current in each of the motors is less than a preselected level.

9. The stall detection and correction system of claim 5 wherein the current path establishing means further comprises:
   a pair of resistor grids operatively connected by first and second electrical switching means, across the armature windings of the pair of traction motors, both of the switching means being actuated from non-conducting states to current conducting states when an electrical braking mode of operation is initiated, the current path establishing means comprising the second switching means which is actuated to its conducting state whenever the current path establishing means becomes responsive so that the second switching means and the resistor grid associated with the motor connected to the other wheel provide the low-resistance path during the spin/stall condition and which returns to the non-conducting state in response to the correction of the spin/stall condition.

10. The stall detection and correction system of claim 9 further comprising:
    means for deenergizing the traction motors if the speed of one wheel remains approximately zero for at least a predetermined interval of time while the current path establishing means is responsive.

11. The stall detection and correction system of claim 5 further comprising:
    means, operative in response to an indication of a spin/stall condition by the indicating means, for controlling an electric power source so that the magnitude of voltage applied to the traction motors is momentarily reduced whenever the current path establishing means becomes operative.

12. The stall detection and correction system of claim 11 further comprising:
    means for deenergizing the traction motors if the speed of one wheel remains approximately zero for at least a predetermined interval of time while the current path establishing means is operative.

13. The stall detection and correction system of claim 11 wherein the electric power source controlling means actuates a controlled re-application of voltage to the traction motors following the momentary reduction thereof.

14. The stall detection and correction system of claim 13 wherein the current path establishing means remains operative for a predetermined minimum length of time for maintaining the low-resistance path in parallel with the motor coupled to the other wheel while voltage increases to a magnitude at least as high as existed just prior to being momentarily reduced by operation of the electric power source controlling means.

15. The stall detection and correction system of claim 14 wherein the current path establishing means comprises electrical switching means for connecting a resistor across the armature winding of the motor coupled to the other wheel during electrical braking, the switching means being actuated from a non-conducting state to a current conducting state whenever the current path establishing means becomes responsive so that it forms, with the resistor, the low-resistance path during the spin/stall condition and returns to its non-conducting state in response to the correction of the spin/stall condition.

16. A stall responsive system for a traction vehicle having at least one pair of electric traction motors that are interconnected for energization by an electric power source and that are respectively operatively connected to at least one wheel on the vehicle, the traction motors being operative alternatively in a propulsion mode and in an electrical braking mode, the vehicle having means for deriving first and second signals representative, respectively, of the rotational speeds of the wheels and means for deriving third and fourth signals representative, respectively, of the magnitudes of electric currents in the pair of traction motors that drive the wheels, the system comprising:
    means, responsive to the first and second signals, for indicating a total stall condition if the speed of both wheels is approximately zero; and means, responsive to the third and fourth signals and to an indication of a total stall condition from the indication means, for deenergizing the motors in delayed response to the occurrence of a total stall condition, the delay being an inverse function of the higher magnitude of current in the pair of motors.

17. The stall responsive system of claim 16 further comprising:
 means, responsive to the first and second signals, for indicating a spin/stall condition when the speed of one wheel is approximately zero and the speed of the other wheel is greater than a predetermined reference speed; and
 means, responsive to a spin/stall condition indicated by the spin/stall indicating means, for establishing a current path in parallel with the motor coupled to the other vehicle wheel, wherein current in the motor coupled to one wheel will increase and the resulting increase in torque at the one wheel tends to correct the spin/stall condition.

18. The stall responsive system of claim 16 further comprising:
 means for preventing the total stall condition indicating means from indicating a total stall condition whenever the motors are operating in the electrical braking mode.

19. The stall responsive system of claim 16 wherein the deenergizing means is also responsive to the third and fourth signals so that a total stall condition will not be indicated as long as the magnitude of current in each of the motors is less than a preselected level.

20. A method for correcting a stalled condition in a traction vehicle, the vehicle having at least one pair of electric traction motors energized by electric current from an electric power source, each traction motor being operatively connected to at least one wheel, the method comprising the steps of:
 monitoring the rotation of each wheel and sensing non-rotation of either of the wheels;
 increasing the current supplied to the motor connected to the sensed non-rotating wheel wherein the resulting increase in torque at the non-rotating wheel tends to correct the stalled condition;
 monitoring the current in each motor;
 detecting the higher current magnitude; and
 preventing the rotation monitoring step from sensing non-rotation of one wheel when the magnitude of current in each of the motors is less than a preselected level.

21. The method of claim 20 wherein the rotation monitoring step is adapted for sensing a total stall condition defined as when both of the vehicle wheels stop rotating, further comprising the steps of:
 monitoring the current in each of the motors and detecting the higher magnitude thereof;
 upon the detection of a total stall condition, initiating a variable time period;
 at the end of the variable time period, deenergizing both motors; and
 varying the length of the time period as an inverse function of the higher magnitude of current.

22. The method of 20 wherein the current increasing step is performed concurrently with a reduction of voltage to the motor coupled to the other wheel, wherein both the current increasing and voltage reducing steps are performed for a predetermined minimum time period.

23. The method of claim 20 wherein the monitoring step is operative to sense a condition which occurs when the first wheel is not rotating and the second wheel is rotating faster than a predetermined reference speed, wherein the current increasing step comprises:
 connecting a resistor grid across the armature winding of the motor coupled to the other wheel; and
 momentarily reducing the magnitude of voltage applied to both motors immediately prior to performing the current increasing step for minimizing power transients.

24. The method of claim 23 wherein the current increasing step is operative for a predetermined minimum time period; and
 upon connecting the resistor grid across the motor connected to the other wheel, rapidly increasing the voltage applied to the motors to a magnitude at least as high as existed just prior to performing the voltage reducing step.

25. The method of claim 24 wherein the current increasing step further comprises:
 disconnecting the resistor grid from the motor connected to the other wheel in delayed response to the correction of the spin/stall condition.

26. A method of responding to a sensed condition of a traction vehicle having at least one pair of electric traction motors operatively connected to at least two vehicle wheels, the method comprising the steps of:
 monitoring the rotation of each wheel and sensing when both of the wheels stop rotating;
 monitoring the current in each of the motors and detecting the higher magnitude thereof;
 deenergizing both motors if at the end of a variable time period that starts upon the occurrence of both vehicle wheels stopping rotation in the rotation monitoring step; and
 varying the length of the time period as an inverse function of the higher magnitude of current.

27. The method of claim 26 further comprising the step of:
 preventing the rotation monitoring step from sensing that both vehicle wheels which have stopped rotating when the magnitude of current in each of the motors is less than a preselected level.

28. A system for responding to a sensed condition in a traction vehicle having at least one pair of electric traction motors operatively connected to first and second wheels, the system comprising:
 means for monitoring the rotation of each wheel and sensing when both of the vehicle wheels stop rotating;
 means for monitoring the current in each of the motors and detecting the higher magnitude thereof;
 means for deenergizing both motors if at the end of a variable time period initiated by the sensing of both vehicle wheels having stopped rotating by the rotation monitoring means; and
 means for varying the time period as an inverse function of the higher magnitude of current.

29. The system of claim 28 further comprising:
 means for preventing the rotation monitoring means from sensing that both vehicle wheels have stopped rotating when the magnitude of current in each of the motors is less than a preselected level.

* * * * *